(12) United States Patent
Kishi et al.

(10) Patent No.: US 6,914,605 B2
(45) Date of Patent: Jul. 5, 2005

(54) GRAPHIC PROCESSOR AND GRAPHIC PROCESSING SYSTEM

(75) Inventors: Tetsuji Kishi, Osaka (JP); Atsushi Kotani, Osaka (JP); Atsushi Nagata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 348 days.

(21) Appl. No.: 09/811,601

(22) Filed: Mar. 20, 2001

(65) Prior Publication Data

US 2001/0024205 A1 Sep. 27, 2001

(30) Foreign Application Priority Data

Mar. 21, 2000 (JP) ........................................ 2000-077619

(51) Int. Cl.[7] .............................................. G06F 13/14
(52) U.S. Cl. ...................... 345/520; 345/522; 345/535; 345/537
(58) Field of Search ................................ 345/537, 637, 345/520, 535, 530, 522, 188, 538; 710/113, 114, 116, 119, 107–125; 711/100, 202, 220

(56) References Cited

U.S. PATENT DOCUMENTS

| | | | |
|---|---|---|---|
| 5,321,806 A | * | 6/1994 | Meinerth et al. ........... 345/522 |
| 5,507,026 A | * | 4/1996 | Fukushima et al. |
| 5,687,304 A | | 11/1997 | Kiss |
| 5,767,858 A | | 6/1998 | Kawase et al. |
| 5,767,866 A | * | 6/1998 | Chee et al. |
| 5,812,138 A | | 9/1998 | Devic |
| 5,966,142 A | | 10/1999 | Harkin |
| 6,204,864 B1 | * | 3/2001 | Chee |
| 6,600,492 B1 | * | 7/2003 | Shimomura et al. ........ 345/501 |

FOREIGN PATENT DOCUMENTS

JP 2000-056992 2/2000

* cited by examiner

Primary Examiner—Matthew C. Bella
Assistant Examiner—Hau Nguyen
(74) Attorney, Agent, or Firm—McDermott Will & Emery LLP

(57) ABSTRACT

The rendering performance of a graphic processor is improved by effectively using a data bus. An externally-input graphics command is stored in a work memory via the data bus. A display data generation section receives a graphics command stored in the work memory via the data bus, decodes the received graphics command, and outputs the display data to the data bus. An image display section receives display data stored in the work memory via the data bus, and displays an image on a display device. A bus control section monitors the status of use of the data bus, and controls the right to use the data bus according to the priority of each data transfer operation.

29 Claims, 11 Drawing Sheets

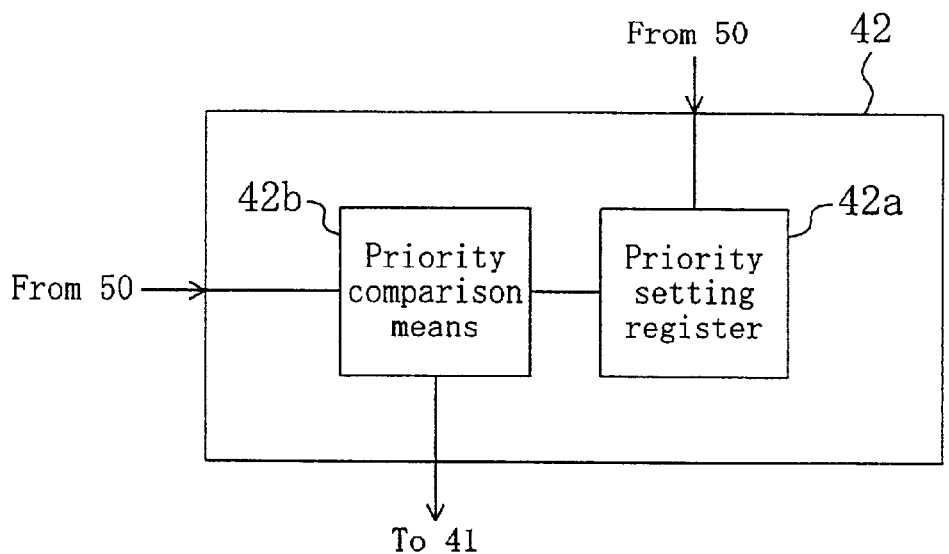

| polygon | Number of elements | (X1, Y1) | (X2, Y2) | | | | (Xn, Yn) |
|---|---|---|---|---|---|---|---|
| | | | | | | | |

GRAPHIC PROCESSOR AND GRAPHIC PROCESSING SYSTEM

BACKGROUND OF THE INVENTION

The present invention relates to a graphic processor for rendering computer graphics elements.

In recent years, the computer graphics (CG) technology has seen a remarkable progress. Typical applications of computer graphics include CAD, CAE, video games, etc. Recently, computer graphics has also been used for displaying map information such as in car navigation systems.

Computer graphics requires a graphics command for performing a graphic operation and coordinate data of an element to be rendered. A texture mapping technique of applying a texture on an element requires texture data representing the texture to be applied on the object. In recent years, along with the increase in the amount of data which can be processed, there is a demand for a finer graphic operation, whereby the amount of rendering data required has been ever increasing. While computer graphics also requires a frame buffer for storing image data of a display screen, the size of the display screen has also been increasing. As a result, a contemporary graphic processor requires a work memory with a huge storage capacity.

Conventionally, a data memory to be the work area for processing the rendering data and a frame memory to be the rendering area for storing display data are configured separately. Recently, a unified memory architecture (UMA) has been proposed in the art, where the work area and the rendering area are configured in a single memory. In the unified memory architecture, the relationship between the graphic processor and the memory is uniquely determined, thereby simplifying the system configuration and significantly reducing the cost.

FIG. 10 is a block diagram illustrating a configuration of a conventional graphic processor. Referring to FIG. 10, a graphic processor 200 receives, via an external bus 201, a graphics command which is generated between a CPU 202 and a memory 203. The received graphics command is supplied from a CPU interface 211 to a FIFO memory 215 via a first data bus 213. The graphics command received by the FIFO memory 215 is decoded by graphics command decoding means 216, and rendering means 218 performs the graphic operation according to the decoding result. Display data obtained by the graphic operation is supplied from a memory interface 212 to a work memory 204 via a second data bus 214. The display data stored in the work memory 204 is supplied to display means 219 via the second data bus 214 and displayed on a display device 205.

Thus, while an externally-input graphics command is supplied to the FIFO memory 215 via the first data bus 213, the other data is transferred between the CPU interface 211 and the memory interface 212 via the second data bus 214.

Problems to be Solved

Possible approaches to increase the data transfer rate for the purpose of improving the rendering performance include, for example, to improve the operating speed (clock rate) or to increase the bus width of a data bus. However, an increase in the operating speed creates other problems such as an increase in the power consumption. Therefore, in many cases, the data bus width is increased. However, since the conventional graphic processor as described above requires at least two data buses, the increase in the bus width may lead to a significant increase in cost in a case where the graphic processor is implemented in an LSI.

Another possible approach is to share a data bus. In such a case, however, a plurality of types of data flow along the single data bus, whereby data transfer operations may contend with one another, leading to other problems, e.g., it may be difficult to ensure a desirable graphics command supply rate, or the displayed image may be intermitted. A possible solution to such problems is, for example, to substantially increase the storage capacity of an internal memory. However, such a solution also leads to a significant increase in cost.

A graphics command is typically variable-length data, not fixed-length data. This is because coastlines, residential blocks, etc., used in map rendering as in car navigation systems, for example, require element data consisting of a series of many coordinate points which cannot be represented by simple triangles and/or rectangles.

For example, a road, or the like, is represented by a series of straight lines as illustrated in FIG. 11A, and a graphics command for rendering such a series of straight lines contains a plurality of coordinate points constituting the series of straight lines as illustrated in FIG. 11B. A residential block, or the like, is represented by a polygon as illustrated in FIG. 12A, and a graphics command for rendering such a polygon contains a plurality of coordinate points constituting the boundary line thereof as illustrated in FIG. 12B.

Where the inside of the element as illustrated in FIG. 12A is filled, in order to quickly complete a graphic operation, the filling operation cannot be performed until the boundary line has been drawn. Accordingly, it is indispensable to quickly complete drawing the boundary line. Therefore, for animation display with scrolling at a time interval of, for example, 1/30 sec or 1/60 sec, it is necessary to supply sufficient coordinate data required for the graphic operation. The operation of filling the inside of an element can be performed according to, for example, the algorism disclosed in "Jissen Computer Graphics", Nikkan Kogyo, pp. 100–102.

In order to reliably supply a graphics command containing such variable-length data with the above-described conventional example, it is necessary for the CPU to control the FIFO memory storing the graphics command of the graphic processor at a predetermined time interval. In such a case, however, a substantial load is imposed on the CPU, and the load is particularly significant when processing a graphics command with a great data length. However, since the CPU performs OS operations for the graphic processing system as a whole, such a load on the CPU may deteriorate the overall performance or response speed of the system. While improving the performance of the CPU is of course a possible solution, it will increase the system cost. A possible approach to reduce the load on the CPU is to increase the storage capacity of the FIFO, but this also lead to an increase in cost.

SUMMARY OF THE INVENTION

An object of the present invention is to improve the rendering performance of a graphic processor by effectively using a data bus.

Specifically, the present invention provides a graphic processor, including: a first interface for receiving an externally-input graphics command; a second interface for performing a data transfer operation between the graphic processor and a work memory; a data bus for transferring data between the first interface and the second interface; a display data generation section for receiving a graphics command from the data bus, generating display data by decoding the graphics command, and outputting the generated display data to the data bus; an image display section for receiving the display data from the data bus and displaying an image on a display device; and a bus control section for monitoring a status of use of the data bus and controlling a right to use the data bus, wherein the bus control section sets a priority for each data transfer operation along the data bus and controls the right to use the data bus according to the set priorities.

According to the present invention, the right to use the data bus is controlled by the bus control section according to the priorities of data transfer operations. Therefore, even in a case of a data bus which is connected to a system such as a unified memory and handles a plurality of types of data in a unified manner, it is possible to effectively use the data bus without wasting a vacant status thereof. Thus, it is possible to efficiently supply graphics commands, thereby improving the overall efficiency of the graphic processing system.

It is preferred that the bus control section in the graphic processor of the present invention sets a priority for each of at least the following data transfer operations: a data transfer operation of transferring an externally-input graphics command to the work memory; a data transfer operation of supplying a graphics command from the work memory to the display data generation section; and a data transfer operation of supplying display data from the work memory to the image display section.

It is preferred that the bus control section in the graphic processor of the present invention is configured so that a setting of the priorities of data transfer operations can be changed dynamically.

It is preferred that the graphic processor further includes: a pre-decoding section for pre-decoding a graphics command transferred during a data transfer operation of transferring an externally-input graphics command to the work memory; and a processing amount estimating section for estimating a data processing amount at the display data generation section based on a result of the pre-decoding by the pre-decoding section, wherein the bus control section changes the priorities of the data transfer operations according to the data processing amount estimated by the processing amount estimating section. Moreover, it is preferred that when the estimated data processing amount per a predetermined period of time exceeds a predetermined amount, the bus control section sets the priority of a data transfer operation of supplying a graphics command from the work memory to the display data generation section to be higher than the priority of a data transfer operation of transferring an externally-input graphics command to the work memory.

Alternatively, it is preferred that the graphic processor further includes a memory monitor for monitoring an amount of data of graphics commands stored in the work memory, wherein the bus control section changes the priorities of the data transfer operations according to the data amount monitored by the memory monitor. Moreover, it is preferred that when the monitored data amount is smaller than a predetermined amount, the bus control section sets the priority of a data transfer operation of transferring an externally-input graphics command to the work memory to be higher than the priority of a data transfer operation of supplying a graphics command from the work memory to the display data generation section.

Alternatively, it is preferred that: the first interface is connected to an external bus which is provided external to the graphic processor; an external bus monitor for monitoring an amount of data being transferred along the external bus is connected to the external bus; and the bus control section changes the priorities of the data transfer operations along the data bus according to the amount of data being transferred which is monitored by the external bus monitor.

Moreover, it is preferred that: the display data generation section in the graphic processor of the present invention includes a graphics command storing section for temporarily storing a graphics command which is input through the data bus, and a decoding section for decoding a graphics command which is output from the graphics command storing section; the graphics command storing section includes first data storing means and second data storing means, writes graphics commands into selected one of the first and second data storing means in a predetermined address order, and reads out graphics commands from selected one of the first and second data storing means in a predetermined address order; and when a reading address in one of the first and second data storing means from which graphics commands are being read out matches a predetermined check address, the graphics command storing section starts writing new graphics commands into the one of the first and second data storing means.

The present invention also provides a graphic processing system, including: the graphic processor according to the present invention; an external bus connected to the first interface of the graphic processor; a CPU and a memory which are connected to the external bus; a work memory connected to the second interface of the graphic processor; and a display device connected to the image display section of the graphic processor.

The present invention also provides a graphic processor, including: a first interface for receiving an externally-input graphics command; a second interface for performing a data transfer operation between the graphic processor and a work memory; a data bus for connecting the first interface with the second interface; a display data generation section for receiving a graphics command from the data bus, generating display data by decoding the graphics command, and outputting the generated display data to the data bus; and an image display section for receiving the display data from the data bus and displaying an image on a display device, wherein: the display data generation section includes a graphics command storing section for temporarily storing a graphics command which is input through the data bus, and a decoding section for decoding a graphics command which is output from the graphics command storing section; the graphics command storing section includes first data storing means and second data storing means, writes graphics commands into selected one of the first and second data storing means in a predetermined address order, and reads out graphics commands from selected one of the first and second data storing means in a predetermined address order; and when a reading address in one of the first and second data storing means from which graphics commands are being read out matches a predetermined check address, the graphics command storing section starts writing new graphics commands into the one of the first and second data storing means.

BRIEF DESCRIPTION OF THE DRAWINGS

FIG. 3 is a diagram illustrating an internal configuration of graphics priority determination means in the configuration of FIG. 1.

FIG. 4 is an exemplary setting of priorities of data transfer operations.

DETAILED DESCRIPTION OF THE INVENTION

Figure 1:
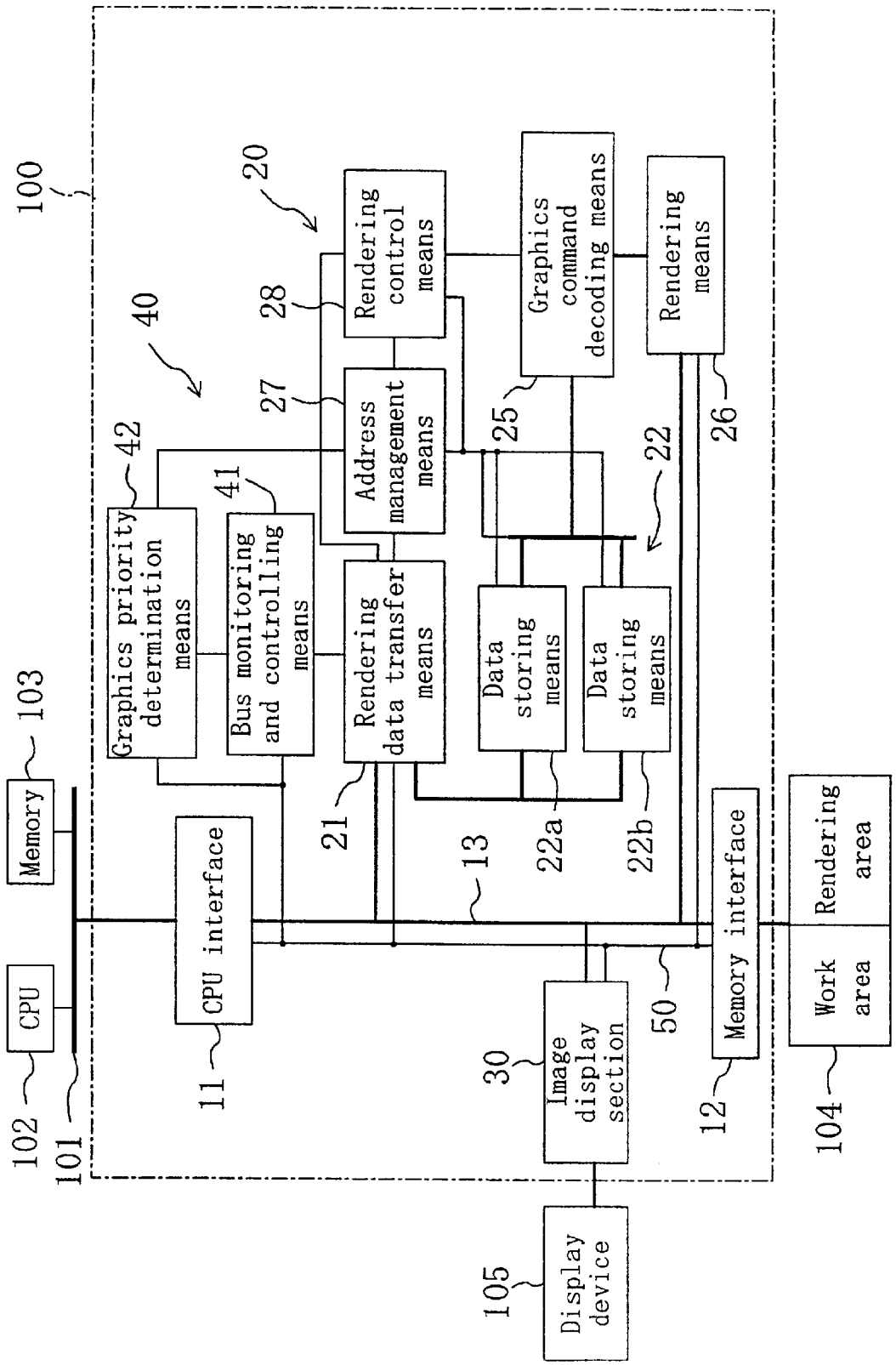
FIG. 1 is a block diagram illustrating a configuration of a graphic processor according to the first embodiment of the present invention.

Embodiments of the present invention will now be described with reference to the accompanying drawings.
First Embodiment FIG. 1 is a block diagram illustrating a configuration of a graphic processor according to the first embodiment of the present invention. Referring to FIG. 1, a graphic processor 100 includes: a CPU interface 11 as a first interface for performing an interface control with a CPU 102 and receiving a graphics command from the CPU 102; a memory interface 12 as a second interface for performing an interface control with a work memory 104; a data bus 13 for transferring data between the CPU interface 11 and the memory interface 12; bus monitoring and controlling means 41 for monitoring the status of a data transfer operation along the data bus 13; graphics priority determination means 42 for managing the priorities of data transfer operations along the data bus 13; a graphics command storing section 22 for temporarily storing a graphics command; rendering data transfer means 21 for controlling the transfer of data from the data bus 13 to the graphics command storing section 22; address management means 27 for managing the addresses of the graphics command storing section 22; graphics command decoding means 25 for decoding graphics commands stored in the graphics command storing section 22; rendering control means 28 for controlling a graphic operation according to an output from the graphics command decoding means 25; rendering means 26 for processing the rendering data received via the graphics command decoding means 25 according to the rendering control means 28; and an image display section 30 for converting the rendered data into data to be displayed as an image and controlling the display.

A display data generation section 20 includes the rendering data transfer means 21, the graphics command storing section 22, the graphics command decoding means 25, the rendering means 26, the address management means 27 and the rendering control means 28. The display data generation section 20 receives a graphics command from the data bus 13, generates display data by decoding the received graphics command, and outputs the generated display data to the data bus 13. A bus control section 40 includes the bus monitoring and controlling means 41 and the graphics priority determination means 42. The bus control section 40 monitors the status of use of the data bus 13 and controls the right to use the data bus 13.

The graphics command storing section 22 includes first data storing means 22a and second data storing means 22b. A control line 50 is used to control a data transfer operation along the data bus 13, etc.

The CPU 102 for supplying graphics commands to the graphic processor 100, a memory 103 used by the CPU 102 for arithmetic and control operations, an external bus 101 used by the CPU 102 and the memory 103, a display device 105 for displaying image display data which is output from the graphic processor 100, and the work memory 104, are provided in addition to the graphic processor 100, together forming a graphic processing system. The work memory 104 is used as a work area for graphic operations and as a rendering area for storing display data, and has the so-called unified memory architecture (UMA).

Figure 2:
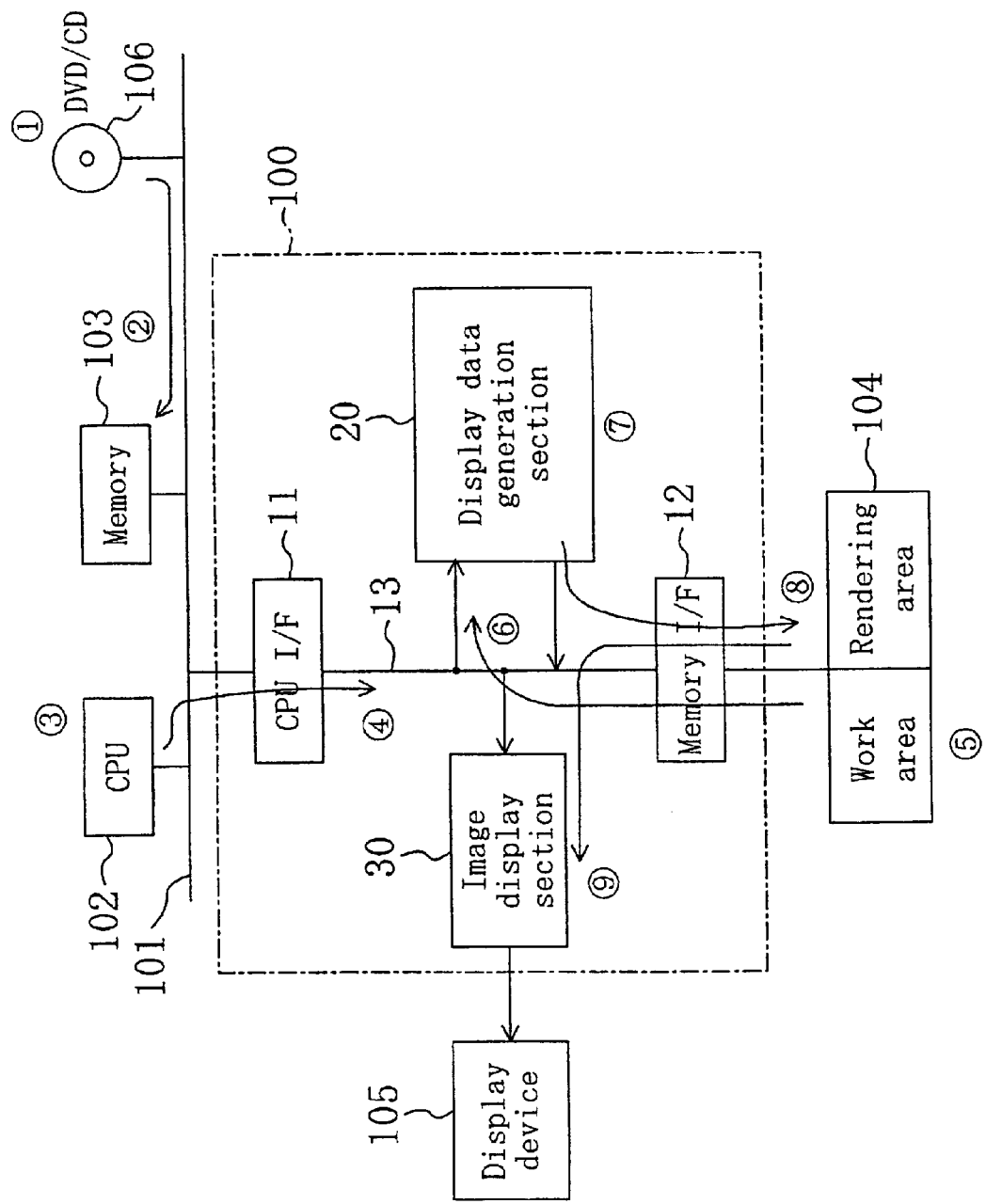
FIG. 2 is a diagram illustrating an operation of the graphic processor of FIG. 1.

FIG. 2 is a diagram illustrating an operation of the graphic processor 100 of FIG. 1. Referring to FIG. 2, first, rendering data (①) recorded on a recording medium 106 such as a DVD, a CD, or the like, is transferred to the memory 103 via the external bus 101 (②). The CPU 102 creates a graphics command executable by the graphic processor 100 from the rendering data stored in the memory 103. The created graphics command is transferred to the work memory 104 via the CPU interface 11, the data bus 13 and the memory interface 12 (④). In this case, the graphics command may be transferred by the CPU 102, or may be transferred in such a manner that there is no direct intervention of the CPU 102, e.g., a DMA transfer operation.

Upon recognizing via the rendering control means 28 that the graphics command has been stored in the work memory 104 (⑤), the display data generation section 20 starts a series of graphic operations. Specifically, the rendering data transfer means 21 transfers a graphics command from the work memory 104 to the graphics command storing section 22 (⑥). Then, the graphics command stored in the graphics command storing section 22 is decoded by the graphics command decoding means 25, and the graphic operation is performed by the rendering means 26 (⑦). The data which has been processed in the graphic operation by the rendering means 26 is transferred to the work memory 104 as display data (⑧).

The display data stored in the work memory 104 is transferred to the image display section 30 and displayed on the display device 105 at a time interval of, for example, 1/30 sec or 1/60 sec (⑨). Thereafter, the series of operations is repeated.

In the present embodiment, the bus control section 40 sets a priority of each type of data transfer operation along the data bus 13, and controls the right to use the data bus 13 according to the set priorities. For example, a priority is set for each of a data transfer operation of transferring an externally-input graphics command to the work memory 104 (④), a data transfer operation of supplying a graphics command from the work memory 104 to the display data generation section 20 (⑥), and a data transfer operation of supplying display data from the work memory 104 to the image display section 30 (⑨).

FIG. 3 is a diagram illustrating an exemplary internal configuration of the graphics priority determination means 42 of FIG. 1. In the example of FIG. 3, the graphics priority determination means 42 includes a priority setting register 42a and priority comparison means 42b. The priority of each type of data transfer operation along data bus 13 is set in the priority setting register 42a. The priority comparison means 42b recognizes via the control line 50 any device requesting a data transfer operation after the current data transfer operation, determines the next data transfer operation to be performed by referencing the contents of the priority setting register 42a, and instructs the bus monitoring and controlling means 41. The bus monitoring and controlling means 41 grants the right to use the data bus 13 to the device for the next data transfer operation to be performed.

FIG. 4 is a diagram illustrating an exemplary priority setting. In the example of FIG. 4, a smaller priority value indicates a higher priority. In this example, a display data supply operation is given the highest priority. This is because if the display data is not supplied at a time interval of, for example, $\frac{1}{30}$ sec or $\frac{1}{60}$ sec, a normal graphic operation cannot be performed on the display device 105, whereby noise is carried by the displayed element.

Note that the priority setting register 42a is configured so that the setting stored therein can be externally changed via the control line 50. For example, in the example of FIG. 4, while the rendering data writein operation, i.e., the operation of writing the rendering data generated from the rendering means 26, is given the lowest priority, this setting can be changed from the CPU 102 via the CPU interface 11, for example. In other words, the bus control section 40 is configured so that the setting of the priorities of data transfer operations can be changed dynamically.

Note that where the data transfer priorities are fixed, the graphics priority determination means 42 may be implemented with hard logics instead of using registers.

Moreover, in this example, the graphics priority determination means 42 starts the next data transfer operation after the current data transfer operation is completed. However, if, during a data transfer operation, a request for another data transfer operation of a higher priority, such as the display data supply operation, the rendering data writein operation, occurs, the current data transfer operation may be once stopped to first perform the later-requested data transfer operation, after which the first data transfer operation can be resumed.

Note that where another external device is connected to the data bus 13, it is preferred to set a priority of a data transfer operation to be requested by the device. Such data transfer operations include transferring image data taken by a video camera, transferring broadcast data such as TV broadcast data (streaming (MPEG4)), transferring image data which has been generated by another image generation device and transmitted therefrom, etc.

In case of input of such an external moving image, it is preferable to give a higher priority to moving image data than to graphics data.

Further, the priority of the display operations may be determined according to a location relationship in a multi-window display or the size of an image to be displayed. For example, in the multi-window display, the priority of display data of an image to be displayed further anteriorly is set higher, or the priority of display data of larger size is set higher. In case of display data of same size, the priority of the moving image data is set higher than that of the graphics data.

Figure 5:
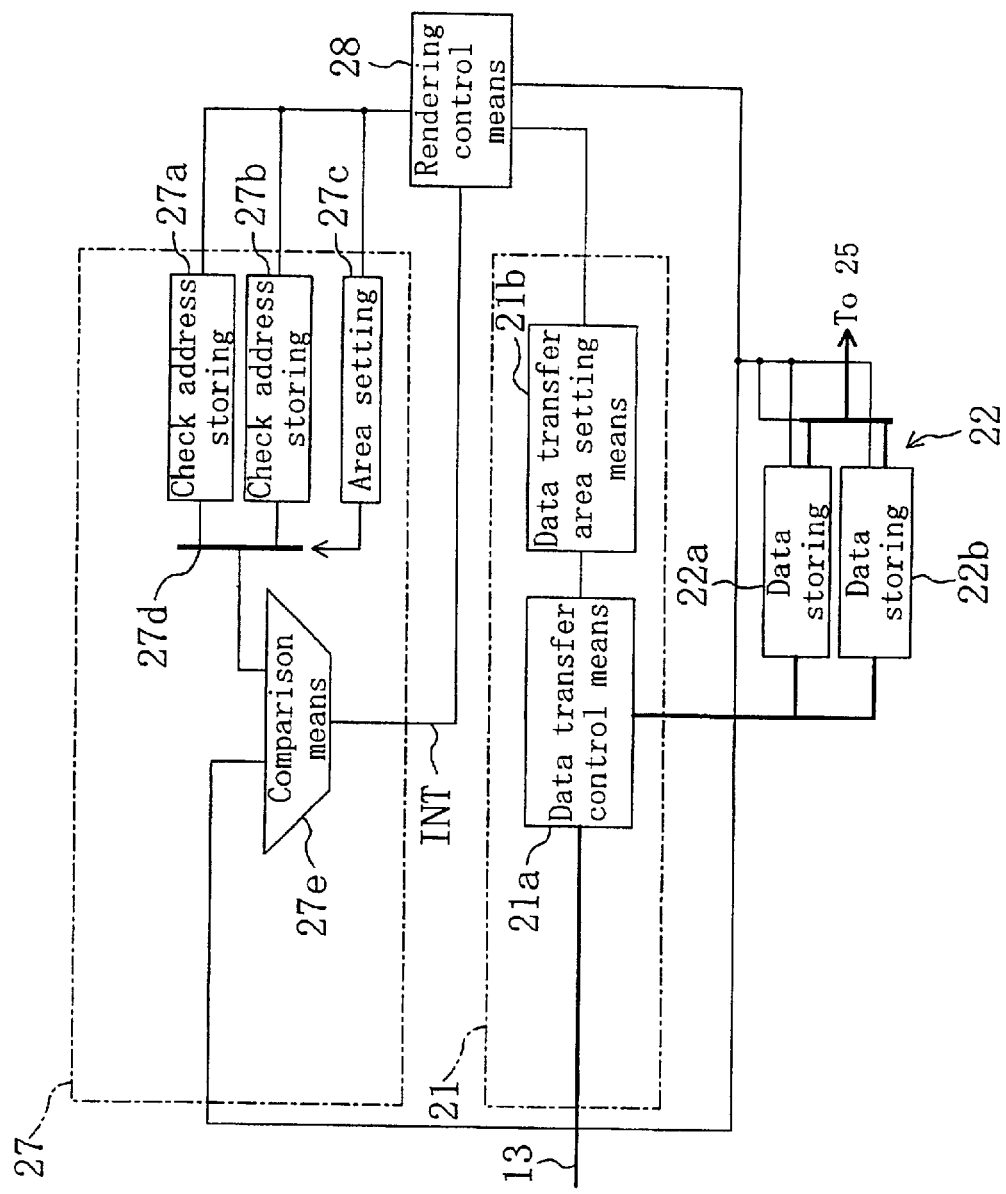
FIG. 5 is a diagram illustrating a configuration for address management of data storing means in the configuration of FIG. 1.

FIG. 5 is a diagram illustrating, in greater detail, a part of the configuration of the display data generation section 20 of FIG. 1. Referring to FIG. 5, the address management means 27 includes: a first check address storing register 27a; a second check address storing register 27b; an area setting register 27c for determining which one of the first and second check address storing registers 27a and 27b is to be used; a selector 27d for selecting the value of one of the first and second check address storing registers 27a and 27b according to the value of the area setting register 27c; and comparison means 27e for comparing the output from the selector 27d with the address value which is output by the rendering control means 28 for accessing the graphics command storing section 22.

The rendering data transfer means 21 includes data transfer control means 21a for controlling data transfer of a graphics command, and data transfer area setting means 21b for storing parameters which are necessary for the control by the data transfer control means 21a.

The rendering control means 28 outputs an address to the graphics command storing section 22 and reads out a graphics command from one of the first and second check address storing registers 27a and 27b for a graphic operation. The comparison means 27e compares the address output from the rendering control means 28 with the output from the selector 27d. Upon receipt of the output from the comparison means 27e, the rendering control means 28 outputs data transfer parameters to the data transfer area setting means 21b in the rendering data transfer means 21. The parameters include the access address of the graphics command storing section 22 and the amount of data to be transferred which have been determined based on the decoding result output from the graphics command decoding means 25. The data transfer control means 21a performs the data transfer operation between the display data generation section 20 and the work memory 104 via the memory interface 12 and the data bus 13 according to the parameters received by the data transfer area setting means 21b.

Figure 6:
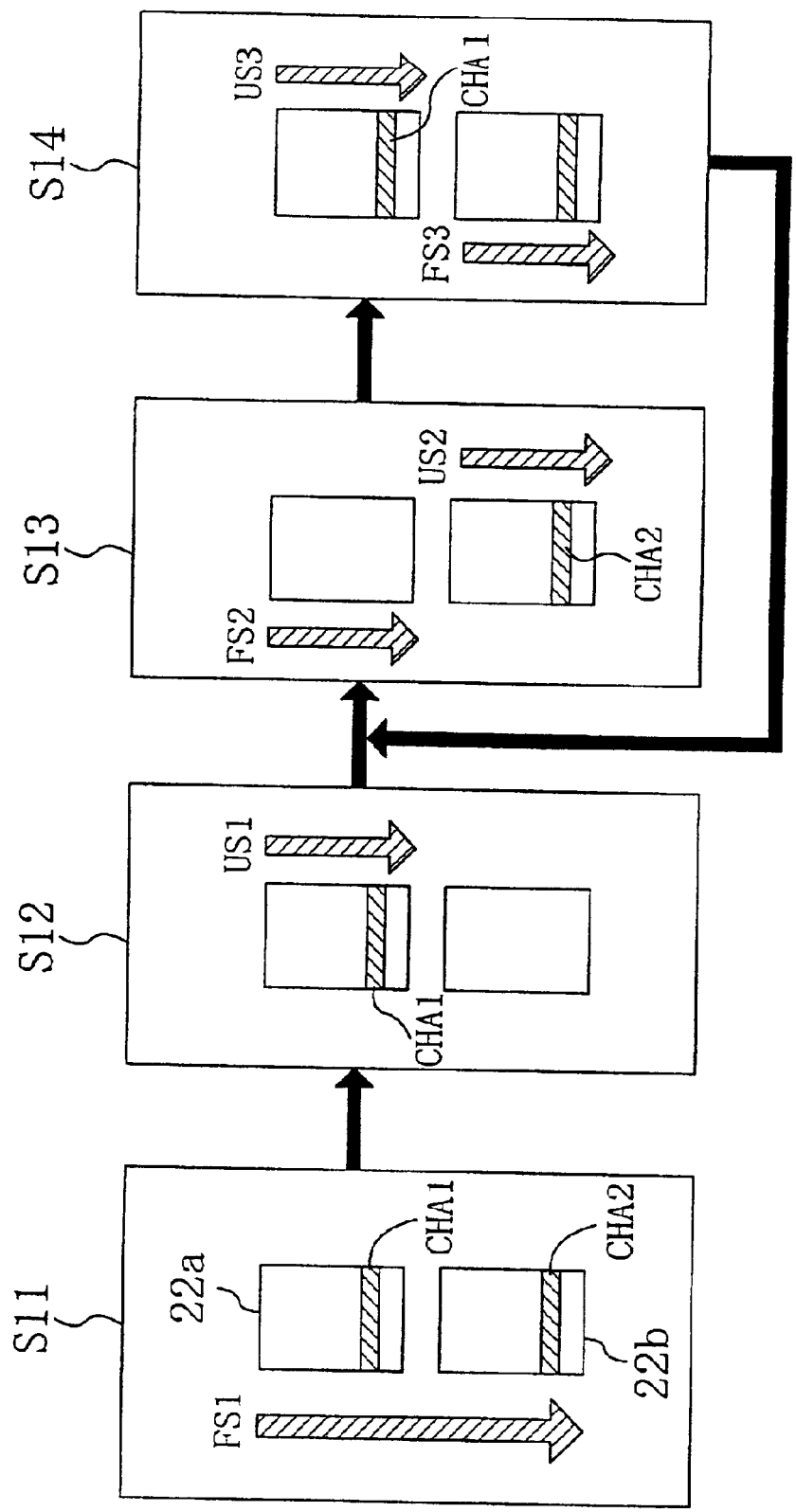
FIG. 6 is a diagram illustrating the address management of the data storing means in the configuration of FIG. 1.

FIG. 6 is a diagram illustrating a graphics command supply sequence. In FIG. 6, reference numerals 22a and 22b denote address maps of the first and second data storing means 22a and 22b, respectively. A first check address CHA1 is an address value which serves as a trigger for supplying new graphics commands to the first data storing means 22a, and is set in the first check address storing register 27a. A second check address CHA2 is an address value which serves as a trigger for supplying new graphics commands to the second data storing means 22b, and is set in the second check address storing register 27b. The setting of the first and second check addresses CHA1 and CHA2 is done in advance by the rendering control means 28. It is assumed herein that each of the first and second check addresses CHA1 and CHA2 is set to be a value in the vicinity of the maximum address value for the address space. A parameter indicating which one of the first and second check address storing registers 27a and 27b is to be checked is set in the area setting register 27c.

In a first step S11, if neither of the first and second data storing means 22a and 22b is filled with graphics commands, data is filled in both of the first and second data storing means 22a and 22b. Graphics commands are filled in the first and second data storing means 22a and 22b according to a data filling sequence FS1, e.g., in an ascending order of address.

In a second step S12, the rendering control means 28 performs a graphic operation by reading out graphics commands filled in the first data storing means 22a according to a data use sequence US1, e.g., in an ascending order of address. When the same address as the first check address CHA1 set in the first check address storing register 27a is accessed, the comparison means 27e in the address management means 27 outputs an interrupt signal INT. Since the first check address CHA1 is set to a relatively large value, the output of the interrupt signal INT means that the graphics commands of the first data storing means 22a will soon be exhausted, allowing for the filling of new graphics commands in the first data storing means 22a. At this point, the value of the area setting register 27c is changed.

In a third step S13, the rendering control means 28, which has received the interrupt signal INT, fills new graphics commands in the first data storing means 22a according to a data filling sequence FS2, e.g., in an ascending order of address. In the meantime, the graphics commands of the second data storing means 22b are read out and executed according to a data use sequence US2, e.g., in an ascending order of address. When the same address as the second check address CHA2 set in the second check address storing register 27b is accessed, the comparison means 27e in the address management means 27 outputs an interrupt signal INT.

In a fourth step S14, when the graphics commands of the first data storing means 22a are being used according to a data use sequence US3, the rendering control means 28 fills new graphics commands in the second data storing means 22b according to a data filling sequence FS3, e.g., in an ascending order of address.

The sequence of alternately repeating the third step S13 and the fourth step S14 after performing the first step S11 and the second step S12 is performed until all graphics commands are completed or until when a special instruction, such as a rendering termination instruction, is issued.

In the sequence as illustrated in FIG. 6, when the first or second check address CHA1 or CHA2 is accessed, the address management means 27 outputs the interrupt signal INT to the graphics priority determination means 42. The graphics priority determination means 42 compares the priority of the graphics command supply operation with the priority of the data transfer operation requesting the use of the data bus 13 next. If the priority of the graphics command supply operation is higher, the graphics priority determination means 42 instructs the bus monitoring and controlling means 41 to preferentially perform the graphics command supply operation.

Figure 7:
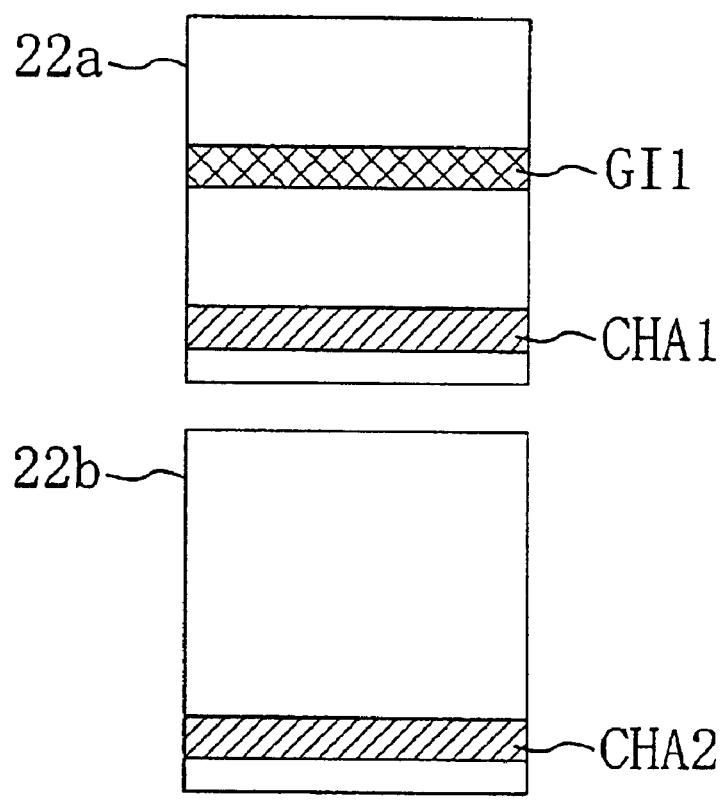
FIG. 7 is a diagram illustrating the address management of the data storing means in the configuration of FIG. 1.

FIG. 7 is a diagram illustrating a principle of operation of the present embodiment focusing on the operation of the first and second data storing means 22a and 22b when the graphics command decoding means 25 decodes a graphics command corresponding to a jump command or a subroutine command which changes the sequence of commands to be executed. In FIG. 7, a graphics command GI1 corresponds to a jump command or a subroutine command.

The graphics command decoding means 25 sequentially takes in the graphics commands from the first and second data storing means 22a and 22b and decodes the graphics commands. When the graphics command GI1 which changes the sequence of commands to be executed is decoded during the decoding operation, the graphics command decoding means 25 instructs the rendering control means 28 to update the graphics commands stored in the first and second data storing means 22a and 22b irrespective of the presence/absence of the output of the interrupt signal INT from the address management means 27. The operation of taking in the graphics commands is performed as described above.

During such a graphics command supply sequence, there is always no direct intervention of the CPU 102 or the memory 103, and the rendering control means 28 independently supplies graphics commands according to the status of consumption of graphics commands.

Note that data may be transferred to the graphics command storing section 22 via the rendering data transfer means 21 or directly from the data bus 13. Two check address storing registers are provided in the example described above. Alternatively, for example, only one storing register may be updated.

As described above, the graphic processor of the present embodiment provides the management of the priorities of data transfer operations along the data bus. Therefore, even in a case of a data bus which is connected to a system such as a unified memory and handles a plurality of types of data in a unified manner, it is possible to effectively use the data bus without wasting a vacant status thereof. Thus, it is possible to efficiently supply graphics commands, thereby improving the overall efficiency of the graphic processing system.

Second Embodiment

Figure 8:
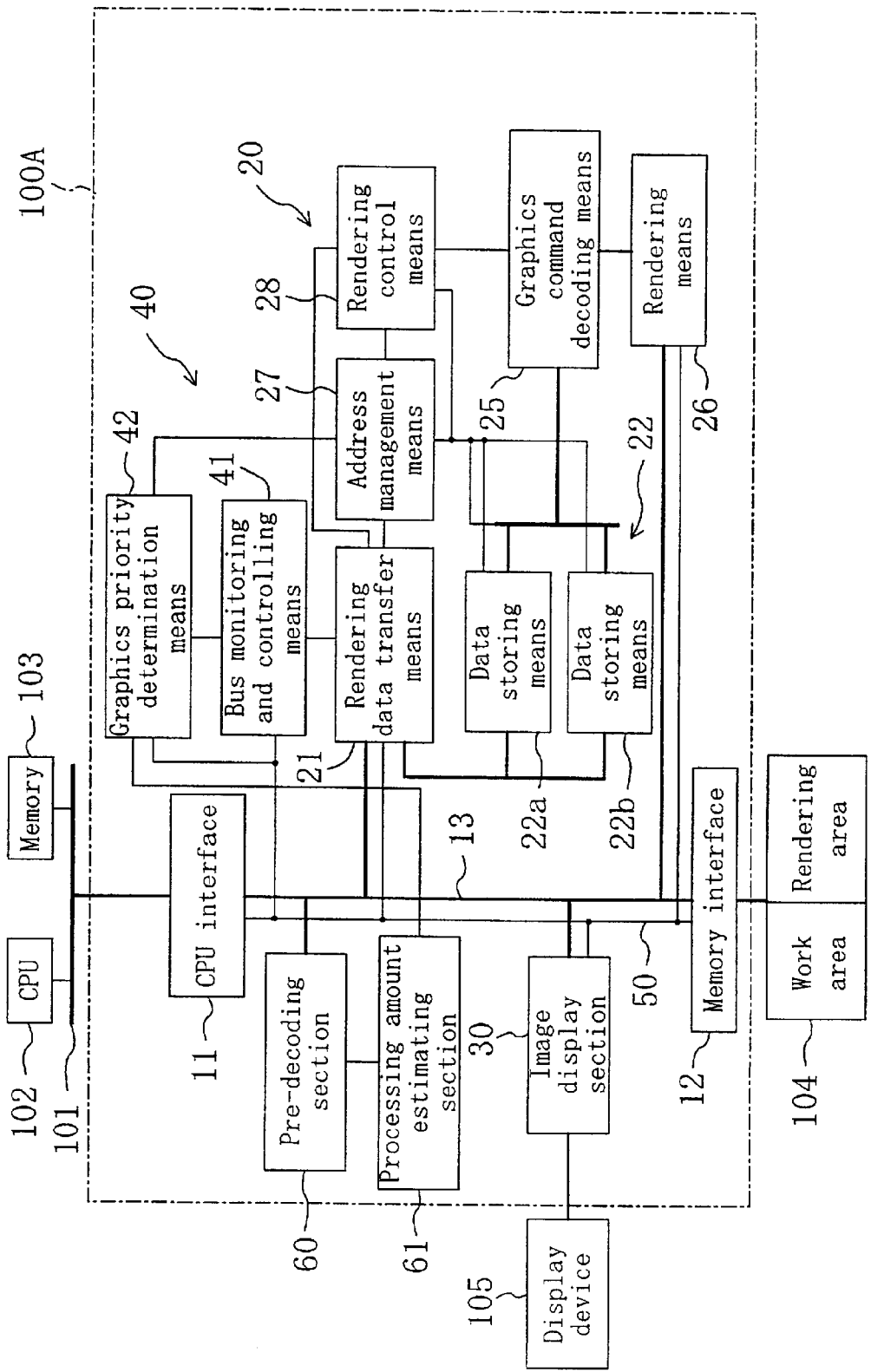
FIG. 8 is a block diagram illustrating a configuration of a graphic processor according to the second embodiment of the present invention.

FIG. 8 is a diagram illustrating a configuration of a graphic processor according to the second embodiment of the present invention. In FIG. 8, each component that is also shown in FIG. 1 is denoted by the same reference numeral. The basic operation flow is as that of the first embodiment. A difference from the first embodiment is that a pre-decoding section 60 and a processing amount estimating section 61 are added.

In a graphic processor 100A illustrated in FIG. 8, the pre-decoding section 60 pre-decodes a graphics command flowing along the data bus 13 during a data transfer operation of transferring an externally-input graphics command to the work memory 104. The processing amount estimating section 61 estimates the data processing amount at the display data generation section 20 based on the result of the pre-decoding by the pre-decoding section 60. Specifically, for example, the data processing amount is estimated by obtaining, from the pre-decoding result, statistical data regarding the distribution of types of graphics commands such as a line graphics command, a polygon graphics command, etc.

Figures 11A, 11B:
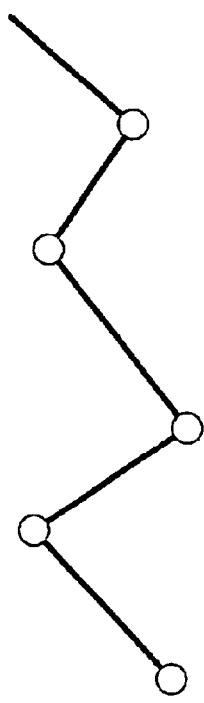
FIG. 11A is an exemplary rendering of a series of straight lines.
FIG. 11B is an exemplary graphics command for a series of straight lines.
Figures 12A, 12B:
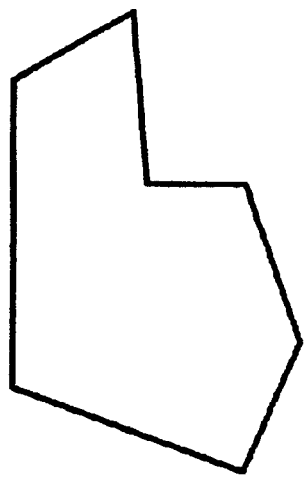
FIG. 12A is an exemplary rendering of an arbitrary-vertex polygon.
FIG. 12B is an exemplary graphics command for a polygon.

In order to obtain the statistical data, weightings parameters for determining the priorities of the line graphics command and the polygon graphics command are set beforehand. In detail, a higher priority is set to a polygon having more vertexes for the polygon graphics command, and each priority of a series of straight lines is determined according to the number of vertexes for the line graphics command, as illustrated in FIG. 11A.

The bus control section 40 updates the contents of the priority setting register 42a of the graphics priority determination means 42 and changes the setting of the priorities of data transfer operations along the data bus 13 according to the data processing amount estimated by the processing amount estimating section 61. For example, when the estimated data processing amount per a predetermined period of time exceeds a predetermined amount, the priority of the graphics command supply operation is increased. Specifically, the priority of the data transfer operation of supplying a graphics command from the work memory 104 to the display data generation section 20 is set to be higher than the priority of the data transfer operation of transferring an externally-input graphics command to the work memory 104. In such a case, it is preferred that parameters such as the predetermined time and the predetermined amount used for the determination can be set externally.

As described above, according to the present embodiment, the setting of the priorities of data transfer operations is changed according to an estimate processing amount for a graphics command, whereby it is possible to supply graphics commands without intermission.

Third Embodiment

Figure 9:
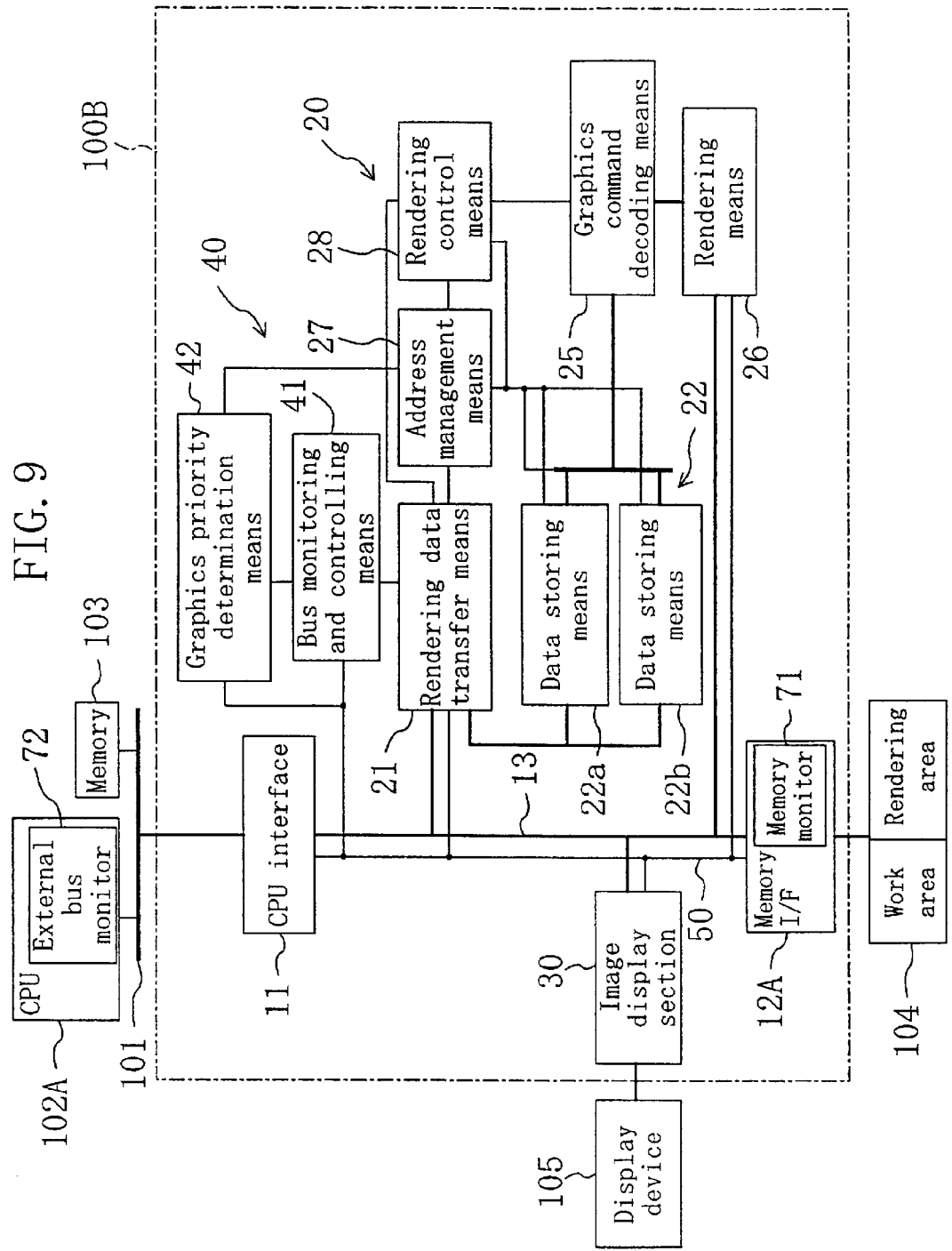
FIG. 9 is a block diagram illustrating a configuration of a graphic processor according to the third embodiment of the present invention.
Figure 10:
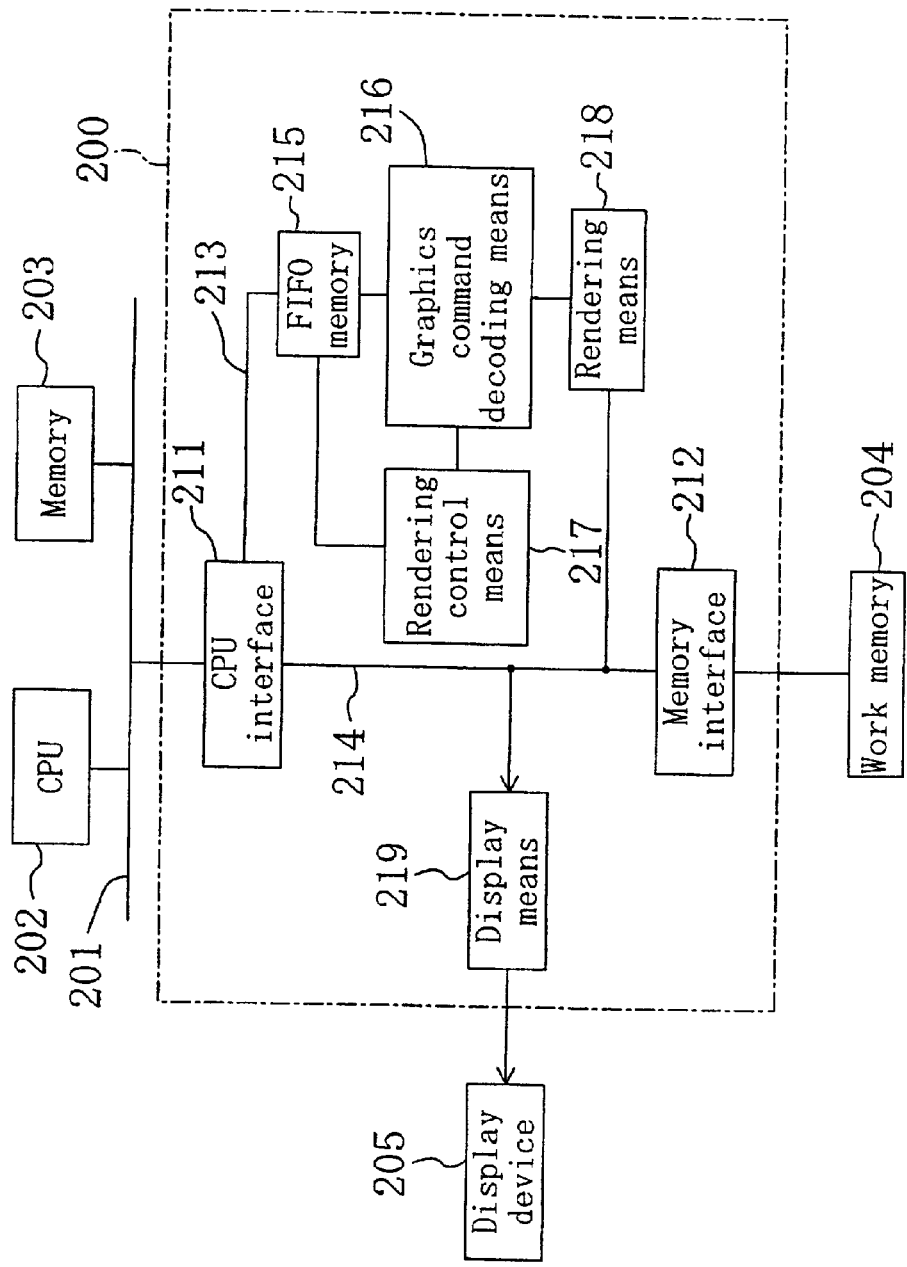
FIG. 10 is a block diagram illustrating a configuration of a conventional graphic processor.

FIG. 9 is a diagram illustrating a configuration of a graphic processor according to the third embodiment of the present invention. In FIG. 9, each component that is also shown in FIG. 1 is denoted by the same reference numeral. The basic operation flow is as that of the first embodiment. A difference from the first embodiment is that a memory interface 12A has a memory monitor 71 for monitoring the amount of data of the graphics commands stored in the work memory 104. Moreover, a CPU 102A has an external bus monitor 72 for monitoring the amount of data being transferred along the external bus 101.

The amount of data being transferred can be monitored by confirming whether the data transfer is completed at every given time by timer interruption, or by calculating the amount of data to be transferred from the data transfer length parameter indicating the amount of data of DMA to be transferred.

In a graphic processor 100B illustrated in FIG. 9, the memory monitor 71 in the memory interface 12A monitors the amount of data of unprocessed graphics commands stored in the work memory 104. The bus control section 40 updates the contents of the priority setting register 42a of the graphics priority determination means 42 and changes the setting of the priorities of data transfer operations along the data bus 13 according to the data amount monitored by the memory monitor 71. For example, when the monitored data amount is smaller than a predetermined amount, the priority of the host data supply operation is increased. Specifically, the priority of the data transfer operation of transferring an externally-input graphics command to the work memory 104 is set to be higher than the priority of the data transfer operation of supplying a graphics command from the work memory 104 to the display data generation section 20. In such a case, it is preferred that parameters such as the predetermined amount used for the determination can be set externally.

Moreover, the external bus monitor 72 in the CPU 102A monitors the amount of data being transferred along the external bus 101. The bus control section 40 updates the contents of the priority setting register 42a of the graphics priority determination means 42 and changes the setting of the priorities of data transfer operations along the data bus 13 according to the amount of data being transferred which is monitored by the external bus monitor 72.

Note that the memory monitor 71 may alternatively be provided in a place other than in the memory interface 12A. The external bus monitor 72 may alternatively be provided in a place other than in the CPU 102A.

Note that in each of the above-described embodiments, the function of determining the right to use the data bus 13 may be assigned to, for example, the CPU interface 11 or the memory interface 12, instead of assigning it to the bus monitoring and controlling means 41.

Moreover, in each of the above-described embodiments, the CPU supplying graphics commands and various data is provided external to the graphic processor. Alternatively, the CPU may be provided in the graphic processor. Also, the work memory may alternatively be provided in the graphic processor.

What is claimed is:

1. A graphics processor, comprising:
   a receiving unit for receiving a graphics command from an external unit of the processor;
   a transferring unit for performing a data transfer operation to a memory;
   a display data generation section including a graphics command storing section for temporarily storing a graphics command which is input through a data bus from the memory, and a decoding section for decoding the graphics command which is output from the graphic command storing section for outputting the generated display data to the memory;
   an image display section for receiving the display data from the memory to display an image on a display device;
   wherein the graphic command storing section includes at least first data storing means and second data storing means having a check address, reads out graphics commands from selected one of the first and second storing means in a predetermined address order; and when an address of a graphics command is being read out matches a predetermined check address, the graphics processor compares the priority of storing a graphics command to the first data storing means with the priority of the data transfer operation.

2. The graphic processor of claim 1, further comprising a bus control section for monitoring a status of use of the data bus and controlling a right to use the data bus,
   wherein the bus control section sets a priority for each of at least the following data transfer operations: a data transfer operation of transferring the graphics command to the memory; a data transfer operation of supplying a the graphics command from the memory to the display data generation section; and a data transfer operation of supplying display data from the memory to the image display section.

3. The graphic processor of claim 1, further comprising a bus control section for monitoring a status of use of the data bus and controlling a right to use the data bus,
   wherein the bus control section sets a priority for each data transfer operation along the data bus and controls the right to use the data bus according to the set priorities and
   wherein the bus control section is configured so that a setting of the priorities of data transfer operations can be changed dynamically.

4. The graphic processor of claim 3, further comprising:
   a pre-decoding section for pre-decoding a graphics command transferred during a data transfer operation of transferring the graphics command from a CPU to the memory; and
   a processing amount estimating section for estimating a data processing amount at the display data generation section based on a result of the pre-decoding by the pre-decoding section,
   wherein the bus control section changes the priorities of the data transfer operation according to the data processing amount estimated by the processing amount estimating section.

5. The graphic processor of claim 4, wherein when the estimated data processing amount per a predetermined period of time exceeds a predetermined amount, the bus control section sets the priority of a data transfer operation of supplying a graphics command from the memory to the display data generation section to be higher than the priority of a data transfer operation of transferring the graphics command to the memory.

6. The graphic processor of claim 3, further comprising a memory monitor for monitoring an amount of data of graphics commands stored in the memory,
   wherein the bus control section changes the priorities of the data transfer operations according to the data amount monitored by the memory monitor.

7. The graphic processor of claim 6, wherein when the monitored data amount is smaller than a predetermined amount, the us control section sets the priority of a data transfer operation of transferring an externally-input graphics command to the memory to be higher than the priority of a data transfer operation of supplying a graphics command form the memory to the display data generation section.

8. The graphic processor of claim 3, wherein:

the receiving unit is connected to an external bus which is provided external to the graphic processor;

an external bus monitor for monitoring an amount of data being transferred along the external bus is connected to the external bus; and the bus control section changes the priorities of the data transfer operations along the data bus according to the amount of data being transferred which is monitored by the external bus monitor.

9. The graphic processor of the claim 1, wherein only when the priority of storing a graphics command to the data storing means is higher, the display data generation section stores a graphics command to the data storing means preferently.

10. The graphic processor of the claim 1, wherein the first data storing means and the second data storing means does read out a graphics command simultaneously.

11. A graphics processing system of transferring data through a bus comprising:

central processing unit for transferring a graphics command to a memory;

a display data generation section including a graphics command storing section for temporarily storing a graphics command which is input through the data bus from the memory, and a decoding section for decoding the graphics command which is output from the graphic command storing section for outputting the generated display data to the memory;

an image display section for receiving the display data from the memory to display an image on a display device;

wherein the graphics command storing section includes at least first data storing means and second data storing means having a check address, reads out graphics commands from selected one of the first and second storing means in a predetermined address order; and when an address of a graphics command is being read out matches a predetermined check address, the processor compares the priority of storing a graphics command to the data storing means with the priority of the other data transfer operation.

12. The graphic processing system of the claim 11, wherein only when the priority of storing a graphics command to the data storing means is higher, the display data generation section stores a graphics command to the data storing means preferently.

13. The graphic processing system of claim 11, wherein the first data storing means and the second data storing means is not able to read out a graphics command simultaneously.

14. The graphic processing system of claim 11, wherein the central processing unit, a display data generation section, and a image display section share the bus.

15. The graphic processing system of claim 11, wherein a bus control section sets a priority for each of at least the following data transfer operation:

(a) a data transfer operation for transferring the graphics command to the memory through the bus, (b) a data transfer operation for transferring the graphics command from the memory to the display data generation section through the bus, and (c) a data transfer operation for transferring the display data from the memory to the image display section through the bus.

16. The graphic processing system of claim 15, wherein the data transfer operation for transferring the display data from the memory to the image display section must be given the highest priority at a time interval.

17. The graphic processing system of claim 15, wherein the bus control section is configured so that a setting of the priorities of data transfer operations can be changed dynamically.

18. A graphics processor, comprising:

a graphics command storing section for storing a graphics command, including at least first data storage means and second data storing means having a check address; and a decoding section for decoding the graphics command which is output from the graphic command storing section;

wherein the graphics processor reads out a graphics command from a selected one of the first and second data storing means in a predetermined address order; and when an address of a graphics command being read out matches a predetermined check address, the graphics processor compares the priority of storing a graphics command to the graphics command storing section with the priority of the other data transfer operation.

19. The graphic processor of claim 18, further comprising a bus control section for monitoring a status of use of a data bus and controlling a right to use the data bus, wherein the bus control section sets a priority for each of at least the following data transfer operations: a data transfer operation of transferring the graphics command to a memory; a data transfer operation of supplying the graphics command from the memory to a display data generation section; and a data transfer operation of supplying display data from the memory to an image display section.

20. The graphic processor of claim 18, further comprising a bus control section for monitoring a status of use of the data bus and controlling a right to use the data bus, wherein the bus control section sets a priority for each data transfer operation along the data bus and controls the right to use the data bus according to the set priorities and wherein the bus control section is configured so that a setting of the priorities of data transfer operations can be changed dynamically.

21. The graphic processor of claim 20, further comprising:

a pre-decoding section for pre-decoding a graphics command transferred during a data transfer operation of transferring the graphics command from a CPU to the memory; and a processing amount estimating section for estimating a data processing amount at the display data generation section based on a result of the pre-decoding by the pre-decoding section, wherein the bus control section changes the priorities of the data transfer operation according to the data processing amount estimated by the processing amount estimating section.

22. The graphic processor of claim 21, wherein when the estimated data processing amount per a predetermined period of time exceeds a predetermined amount, the bus control section sets the priority of a data transfer operation of supplying a graphics command from the memory to the display data generation section to be higher than the priority of a data transfer operation of transferring the graphics command to the memory.

23. The graphic processor of claim 20, further comprising a memory monitor for monitoring an amount of data of graphics commands stored in the memory,
wherein the bus control section changes the priorities of the data transfer operations according to the data amount monitored by the memory monitor.

24. The graphic processor of claim 23, wherein when the monitored data amount is smaller than a predetermined amount, the bus control section sets the priority of a data transfer operation of transferring an externally-input graphics command to the memory to be higher than the priority of a data transfer operation of supplying a graphics command form the memory to the display data generation section.

25. The graphic processor of claim 20, wherein:
the receiving unit is connected to an external bus which is provided external to the graphic processor;
an external bus monitor for monitoring an amount of data being transferred along the external bus is connected to the external bus; and
the bus control section changes the priorities of the data transfer operations along the data bus according to the amount of data being transferred which is monitored by the external bus monitor.

26. The graphic processor of the claim 18, wherein only when the priority of storing a graphics command to the data storing means is higher, the display data generation section stores a graphics command to the data storing means preferently.

27. The graphic processor of the claim 18, wherein the first data storing means and the second data storing means does read out a graphics command simultaneously.

28. A graphic processor, comprising:
an interface unit for receiving a graphics command from an external unit of the processor and transferring the graphics command to a memory;
a display data generation section for generating a display data from a graphics command in the memory;
a bus control section for controlling a right to use a bus;
a processing amount estimating section for estimating a data processing amount by pre-decoding a data transferring from the interface unit to the memory;
wherein when the estimated data processing amount of the processing amount estimating section exceeds a predetermined amount, the bus control section increases a priority of the graphics command supply operation from the memory to the display data generation section.

29. The graphics processor of claim 28, wherein the data processing amount is estimated by obtaining a type of the graphics commands.

* * * * *